(12) United States Patent
Xu

(10) Patent No.: US 12,450,861 B2
(45) Date of Patent: Oct. 21, 2025

(54) DRIVER ATTENTION AREA PREDICTION SYSTEM

(71) Applicant: Jiawei Xu, Shanghai (CN)

(72) Inventor: Jiawei Xu, Shanghai (CN)

( * ) Notice: Subject to any disclaimer, the term of this patent is extended or adjusted under 35 U.S.C. 154(b) by 476 days.

(21) Appl. No.: 18/095,573

(22) Filed: Jan. 11, 2023

(65) Prior Publication Data

US 2023/0222756 A1    Jul. 13, 2023

(30) Foreign Application Priority Data

Jan. 11, 2022   (CN) .......................... 202210028986.8

(51) Int. Cl.
| | |
|---|---|
| *G06V 10/25* | (2022.01) |
| *G06T 7/246* | (2017.01) |
| *G06V 10/26* | (2022.01) |
| *G06V 10/36* | (2022.01) |
| *G06V 10/56* | (2022.01) |
| *G06V 10/80* | (2022.01) |
| *G06V 10/82* | (2022.01) |
| *G06V 20/56* | (2022.01) |

(52) U.S. Cl.
CPC .............. *G06V 10/25* (2022.01); *G06T 7/246* (2017.01); *G06V 10/26* (2022.01); *G06V 10/36* (2022.01); *G06V 10/56* (2022.01); *G06V 10/806* (2022.01); *G06V 10/82* (2022.01); *G06V 20/56* (2022.01)

(58) Field of Classification Search
CPC ........ G06V 10/25; G06V 10/26; G06V 10/36; G06V 10/56; G06V 10/806; G06V 10/82; G06V 20/56; G06V 20/597; G06T 7/246; G06N 3/145; G06N 3/08; G06F 18/253
See application file for complete search history.

(56) References Cited

U.S. PATENT DOCUMENTS

| | | | |
|---|---|---|---|
| 2019/0213429 A1* | 7/2019 | Sicconi | .................. G06F 3/012 |
| 2021/0056306 A1* | 2/2021 | Hu | ....................... G06V 40/193 |

FOREIGN PATENT DOCUMENTS

| | | | | |
|---|---|---|---|---|
| CN | 112308005 A | * | 2/2021 | ............. G06N 3/045 |

\* cited by examiner

*Primary Examiner* — Stephen R Koziol
*Assistant Examiner* — Michael Kim Maiden
(74) *Attorney, Agent, or Firm* — Hemisphere Law, PLLC; Zhigang Ma

(57) ABSTRACT

A driver attention area prediction method includes: S1, acquiring an original driving video of a driver attention area and preprocessing the original driving video, thereby obtaining a processed driving video sequence; S2, constructing a deep learning model through a deep learning keras framework and training the deep learning model to obtain a trained deep learning model; S3, performing area prediction on the processed driving video sequence through the trained deep learning model, thereby obtaining a driver attention area prediction result; and S4, outputting the driver attention area prediction result. Moreover, a driver attention area prediction system includes a driving video acquisition and preprocessing module, a model training module, a model application module and a result output module. Differentiated training can be carried out on driving attentions in LHT and RHT scenes, and driving attentions can be accurately predicted as per scenes and conditions.

7 Claims, 6 Drawing Sheets

DRIVER ATTENTION AREA PREDICTION SYSTEM

TECHNICAL FIELD

The disclosure relates to the field of driver attention prediction technology, in particular to a driver attention area prediction method and a driver attention area prediction system.

BACKGROUND

For along time, driving is a task that needs to process a large amount of visual information, and human vision plays the most important role in making appropriate decisions for vehicle control. Therefore, a comprehensive understanding of the driver's visual behavior is an important part of improving driving safety.

In fact, in a real living environment, a traffic driving environment is a complex, dynamic and changeable scene, and there are many subjective and objective factors combined together, affecting the driver's vision and attention. Different traffic driving environments include differences of left-handed traffic (abbreviated as LHT) and right-handed traffic (abbreviated as RHT), as well as safety and danger of driving environments. The subjective factors include bottom-up visual stimuli, which means that a person usually first pays attention to the most important and conspicuous area in a visual scene; and there is also a task-driven top-down visual attention mechanism, which combines prior knowledge and allocates attention to the scene under the control of consciousness. In a process of traffic driving, a driver usually allocates his/her attention to the most important and prominent area or target in current second; and sometimes, the driver should pay attention to more than one prominent area or target, he/she will pay attention to surrounding objects (such as vehicles, pedestrians, traffic signs and other visual stimuli) according to specific scenes, task-related and object-level clues.

Accordingly, a driver attention area prediction method is needed to reasonably allocate the driver's attention and correctly process information of region of interest (ROI) to thereby improve the driver's driving safety.

SUMMARY

In view of the foregoing, the disclosure provides a driver attention area prediction system, which can accurately predict driver's attention allocations under four modes of LHT safety condition, LHT dangerous condition, a RHT safety condition and RHT dangerous condition.

In order to achieve the above purpose, the disclosure provides the following technical solutions.

Specifically, a driver attention area prediction method includes:
S1, acquiring an original driving video of a driver attention area and preprocessing the original driving video, thereby obtaining a processed driving video sequence;
S2, constructing a deep learning model through a deep learning keras framework and training the deep learning model to obtain a trained deep learning model;
S3, performing area prediction on the processed driving video sequence through the trained deep learning model, thereby obtaining a driver attention area prediction result;
S4, outputting the driver attention area prediction result, for a driver learning attention allocation or guiding automatic driving.

In an embodiment, in the S1, preprocessing the original driving video includes:
S1.1, selecting a mode of original driving video input;
S1.2, selecting an original driving video to be predicted according to the mode of original driving video input, thereby obtaining a selection result;
S1.3, performing preprocessing on the original driving video to be predicted based on the selection result and creating a dataset, thereby obtaining the processed driving video sequence.

In an embodiment, in the S1.1, the mode of original driving video input is selected from four driving modes of right-handed traffic (RHT) safety condition driving, RHT dangerous condition driving, left-handed traffic (LHT) safety condition driving and LHT dangerous condition driving.

In an embodiment, performing preprocessing on the original driving video to be predicted includes: performing preprocessing on the original driving video as acquired, abnormal video filtering, abnormal video repairing, missing video compensating, repeated video deleting, image grayscale processing, and image normalization processing.

In an embodiment, in the S2, constructing a deep learning model through a deep learning keras framework and training the deep learning model includes:
S2.1, color feature extraction, comprising: processing RGB color information of an original input video sequence based on a serial encoding module of C3D algorithm and CBAM and extracting a color feature through bilinear sampling;
S2.2, shape feature extraction, comprising: performing semantic segmentation on shape through dilated convolution, processing temporal information based on an encoding module of C3D, and extracting a shape feature through bilinear sampling;
S2.3, motion feature extraction, comprising: using a dense optical flow algorithm to obtain an optical flow field and thereby extract motion information, processing temporal information based on an encoding module of C3D, and extracting a motion feature through bilinear sampling;
S2.4, feature fusion, comprising: fusing the color feature, the shape feature and the motion feature through a multi-layer depth feature fusion algorithm and thereby obtaining a resultant focus-of-attention (FOA).

In an embodiment, outputting the driver attention area prediction result includes: showing a predicted video result, storing a predicted video in the same directory of the original driving video, and directly jumping to a playing interface of driving video of completion of prediction.

In another aspect, a driver attention area prediction system includes:
a video acquisition and preprocessing module, configured (i.e., structured and arranged) to acquire an original driving video of a driver attention area and preprocess the original driving video, thereby obtain a processed driving video sequence;
a model training module, configured to construct a deep learning model and train the deep learning model to obtain a trained deep learning model;
a model application module, configured to perform area prediction on the processed driving video sequence through the trained deep learning model, thereby obtain a driver attention area prediction result;

a result showing module, configured to show a driving video result of completion of prediction.

In an embodiment, the video acquisition and preprocessing module includes a video acquisition sub-module and a video preprocessing module, the video acquisition sub-module includes a video mode selection unit and a video selection unit, the video mode selection unit is configured to select a mode of original driving video input and send a mode result to the video selection unit, the video selection unit is configured to select an original driving video to be predicted, the video preprocessing sub-module is configured to perform preprocessing on the original driving video as acquired, abnormal video filtering, abnormal video repairing, missing video compensating and repeated video deleting.

In an embodiment, the model training module includes a color feature extraction sub-module, a shape feature extraction sub-module, a motion feature extraction sub-module and a fusion sub-module; the color feature extraction sub-module is configured to process RGB color information of an original input video sequence based on a serial encoding module of C3D and CBAM, the shape feature extraction sub-module is configured to perform semantic segmentation on shape through dilated convolution, the motion feature extraction sub-module is configured to use a dense optical flow algorithm to obtain an optical flow field and thereby extract motion information, and the fusion sub-module is configured to fuse a color feature, a shape feature and a motion feature through a multi-layer fusion algorithm and thereby obtain a resultant focus-of-attention.

It can be seen from the above technical solutions that the disclosure may have the following advantages:

compared with the prior art, the method and the system can perform differentiated training on driving attentions in LHT and RHT scenes, and can accurately predict driving attentions in different scenes and situations.

BRIEF DESCRIPTION OF THE DRAWINGS

The accompanying drawings constituting a part of the disclosure are used to provide a further understanding of the disclosure. The illustrative embodiments of the disclosure and their descriptions are used to explain the disclosure and should not be construed as limiting the disclosure.

DETAILED DESCRIPTION OF EMBODIMENTS

In order to make purposes, technical solutions and advantages of the disclosure clearer, the disclosure will be further described in detail below in conjunction with embodiments and the accompanying drawings. The illustrative embodiments of the disclosure and their description are used to explain the disclosure and should not be construed as limiting the disclosure.

Figure 1:
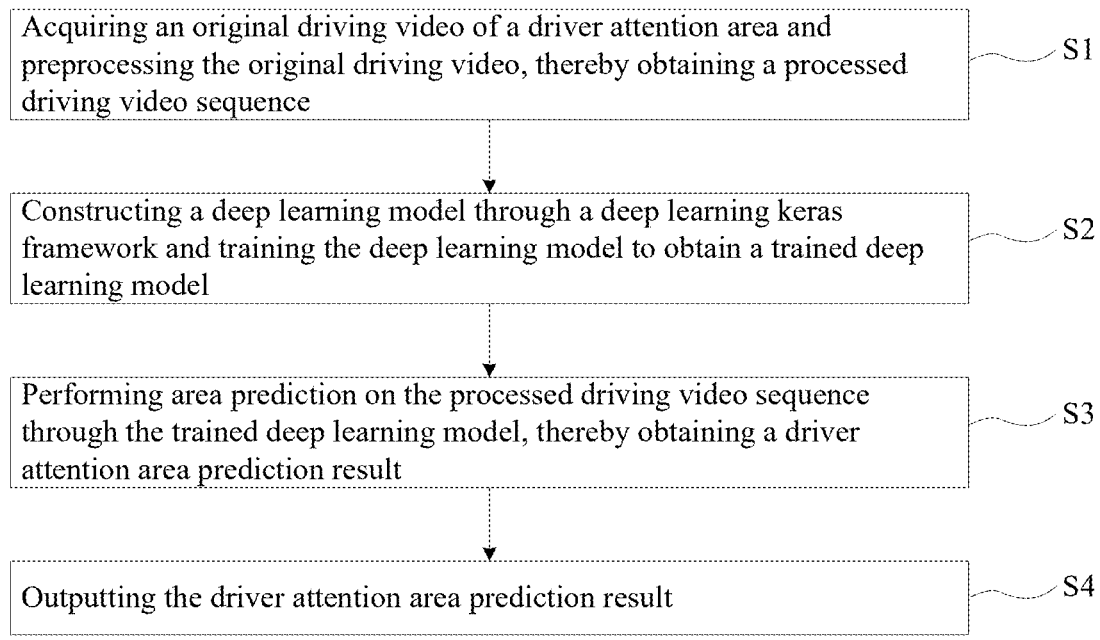
FIG. 1 illustrates schematic flowchart of a driver attention area prediction method according to an embodiment of the disclosure.

Referring to FIG. 1, a driver attention area prediction method is proved. The driver attention area prediction method exemplarily includes the following steps S1 to S4.

S1, acquiring an original driving video of a driver attention area and preprocessing the original driving video, thereby obtaining a processed driving video sequence.

S2, constructing a deep learning model through a deep learning keras framework and training the deep learning model to obtain a trained deep learning model.

S3, performing area prediction on the processed driving video sequence through the trained deep learning model, thereby obtaining a driver attention area prediction result.

S4, outputting the driver attention area prediction result.

It is noted that "keras" generally is an open-source artificial neural network library written by Python, which can be used as the high-level application program interface of TensorFlow, Microsoft CNTK and Theano to design, debug, evaluate, apply and visualize depth learning models.

Figure 2:
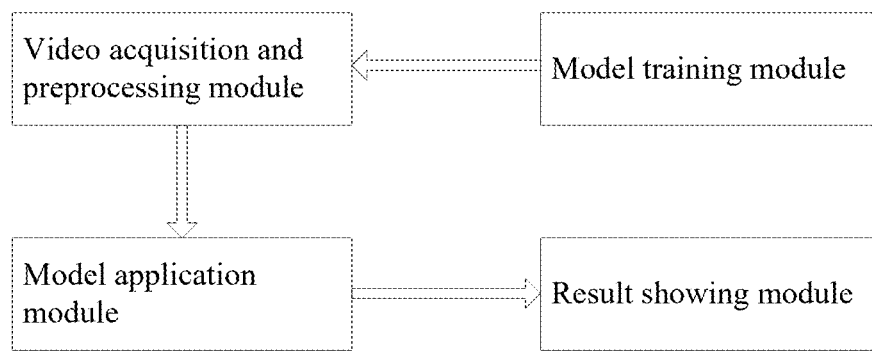
FIG. 2 illustrates a schematic block diagram of a driver attention area prediction system according to an embodiment of the disclosure.

Referring to FIG. 2, a driver attention area prediction system is provided. The driver attention area prediction system exemplarily includes: a video acquisition and preprocessing module, a model training module, a model application module, and a result showing module. The video acquisition and preprocessing module, the model training module, the model application module and the result showing module are sequentially connected. In some embodiments, the video acquisition and preprocessing module, the model training module, the model application module and the result showing module are software modules stored in a memory and executable by a processor coupled to the memory.

Figure 3:
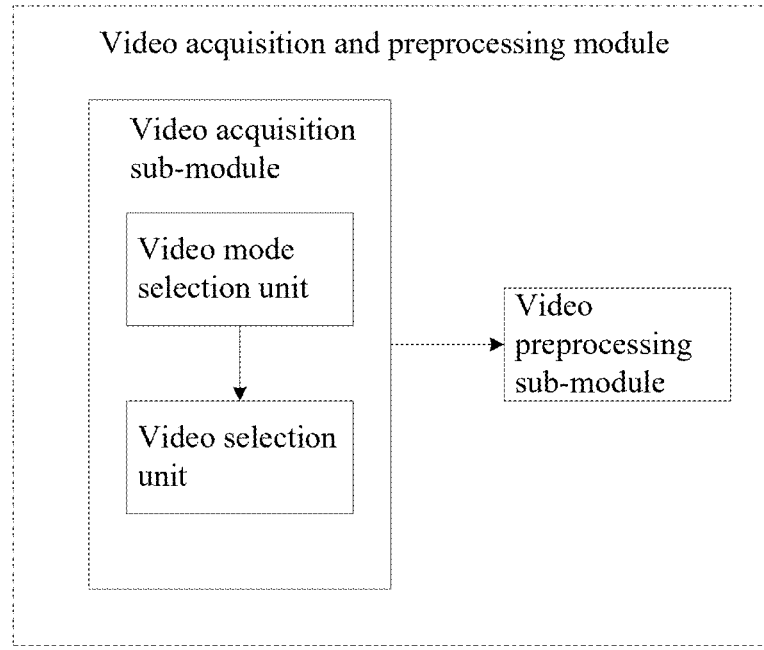
FIG. 3 illustrates a schematic block diagram of a video acquisition and preprocessing module according to an embodiment of the disclosure.

FIG. 3 illustrates a schematic block diagram of the video acquisition and preprocessing module. The video acquisition and preprocessing module is configured (i.e., structured and arranged) to acquire an original driving video of a driver attention area and preprocess the original driving video, thereby obtain a processed driving video sequence. In an embodiment, the video acquisition and preprocessing module includes a video acquisition sub-module and a video preprocessing sub-module. The video acquisition sub-module includes a video mode selection unit and a video selection unit. The video mode selection unit is configured to select a mode of original driving video input and send a mode result to the video selection unit. The video selection unit is configured to select an original driving video to be predicted. The video preprocessing sub-module is configured to perform preprocessing on the acquired original driving video, abnormal video filtering, abnormal video repairing, missing video compensating, and repeated video deleting.

Figure 4:
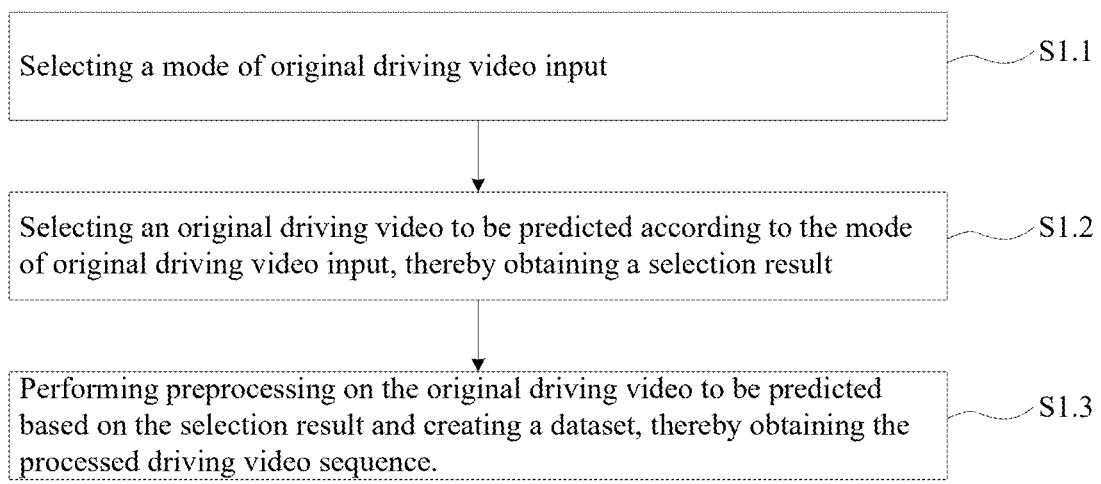
FIG. 4 illustrates schematic steps of a video acquisition and preprocessing method according to an embodiment of the disclosure.

FIG. 4 illustrates a schematic flowchart of a video acquisition and preprocessing method. The video acquisition and preprocessing method includes the following steps S1.1 through S1.3.

S1.1, selecting a mode of original driving video input.

S1.2, selecting an original driving video to be predicted according to the mode of original driving video input, thereby obtaining a selection result.

S1.3, performing preprocessing on the original driving video to be predicted based on the selection result, and creating a dataset, thereby obtaining the processed driving video sequence.

In particular, the mode of original driving video input is selected from four driving modes of RHT safety condition driving, RHT dangerous condition driving, LHT safety condition driving and LHT dangerous condition driving.

The performing preprocessing on the original driving video to be predicted includes: performing preprocessing on the acquired original driving video, abnormal video filtering, abnormal video repairing, missing video compensating, repeated video deleting, image grayscale processing, and image normalization processing.

Figure 5:
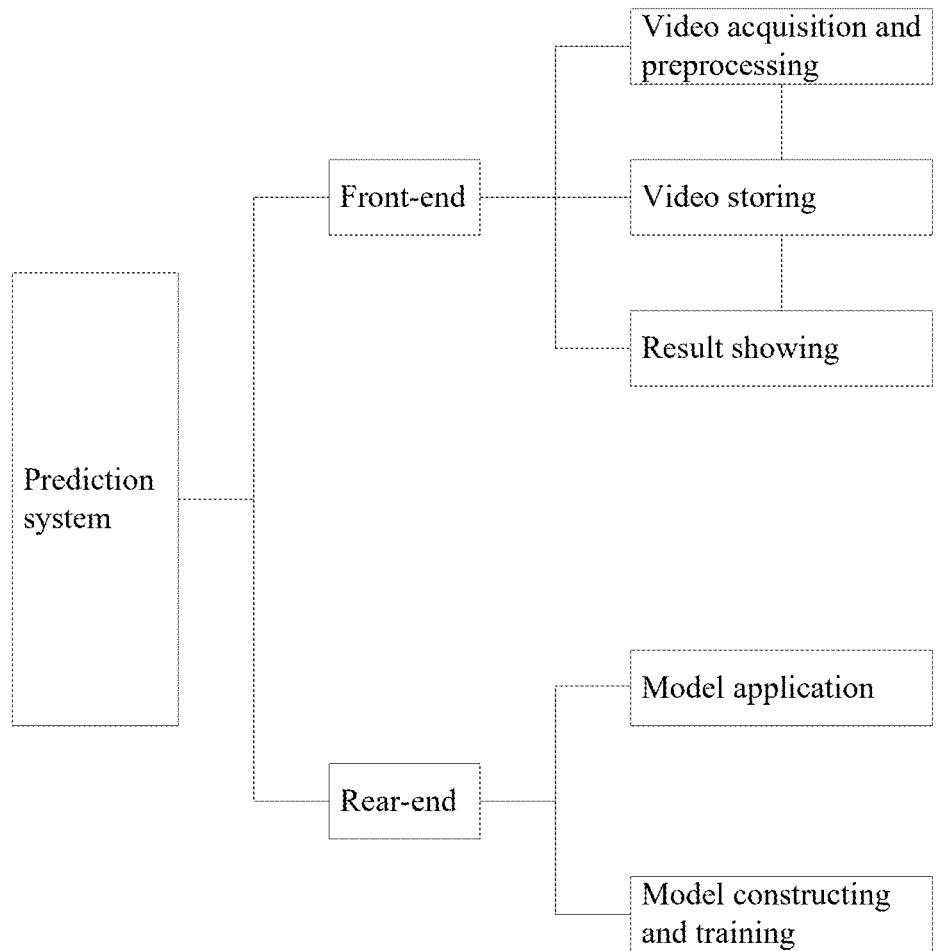
FIG. 5 illustrates a schematic block diagram of a prediction system according to an embodiment of the disclosure.
Figure 6:
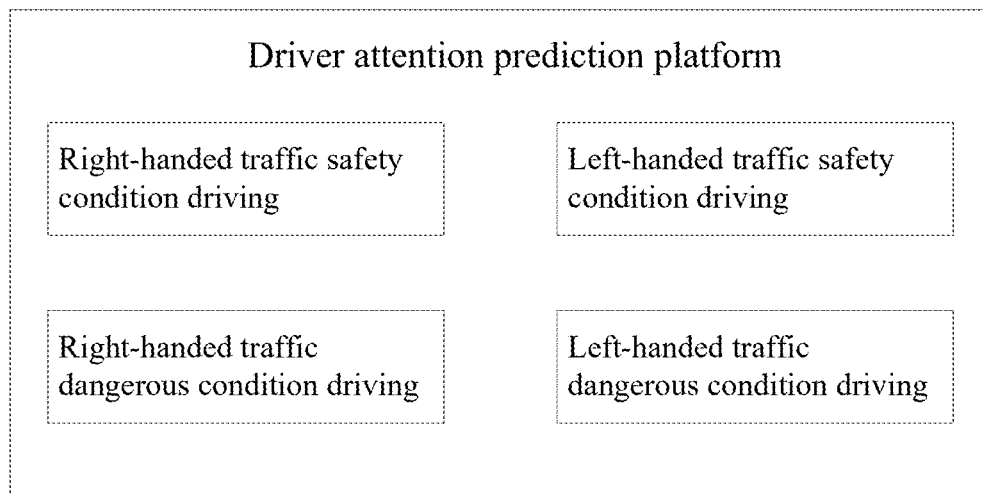
FIG. 6 illustrates a schematic view of a UI interface module according to an embodiment of the disclosure.
Figure 7:
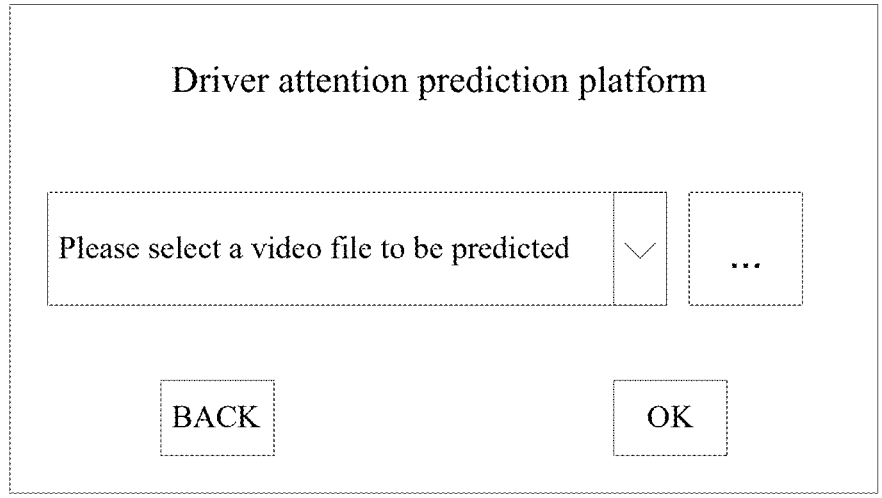
FIG. 7 illustrates a schematic view of another UI interface module according to an embodiment of the disclosure.
Figure 8:
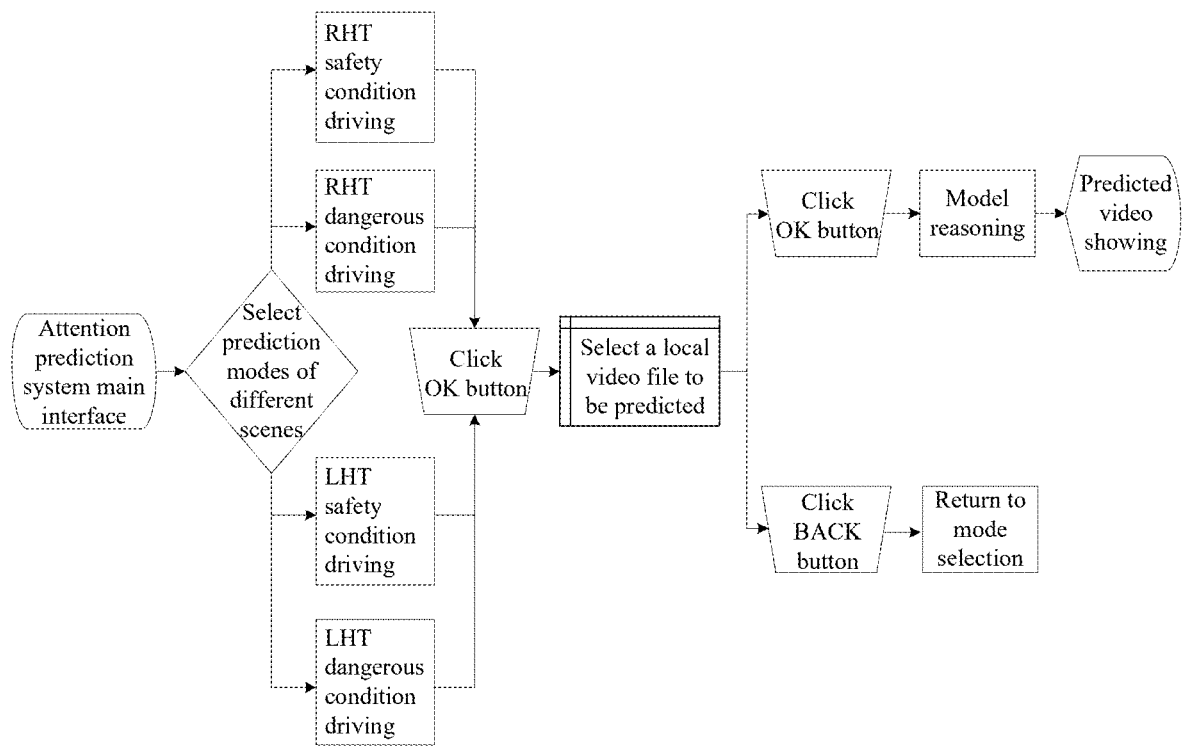
FIG. 8 illustrates a schematic flowchart of front-end operations of a driver attention area prediction system according to an embodiment of the disclosure.

In some embodiments, the prediction system is implemented on Matlab2019b UI interface and IDE (Integrated Development Environment) platform. As illustrated in FIG. 5, the prediction system mainly includes two parts of front-end and rear-end. The front-end of the system is mainly configured to acquire videos and for selection of driving video mode, selection of driving video, and result showing. As illustrated in FIG. 6 and FIG. 7, the system shows the selection of driving video mode and the selection of driving video on the UI interfaces. The selection of driving video mode includes selecting one of four driving modes of RHT safety condition driving, RHT dangerous condition driving, LHT safety condition driving and LHT dangerous condition driving. A driving scene is determined by the selection of driving video mode. The selection of driving video includes an "OK" button and a "BACK" button. A video file to be predicted is determined by the selection of driving video. FIG. 8 illustrates a schematic operation flowchart of the front-end of the driver attention area prediction system. Specifically, prediction modes of different scenes can be selected on the main interface of the attention prediction system, based on four driving modes of RHT safety condition driving, RHT dangerous condition driving, LHT safety condition driving and LHT dangerous condition driving, a specific driving mode may be selected and then the "OK" button is clicked to enter an interface of "Select a local video file to be predicted". In the interface of "select a local video file to be predicted", if "Click the OK button", entering "Model reasoning" and then carrying out "Predicted video showing"; if "Click the BACK button", it will return to the mode selection interface.

The rear-end of the system is mainly configured to construct the deep learning model. The construction of model employs the keras framework, uses features of color, shape and motion to predict focus-of-attention (FOA) respectively, and finally obtain a resultant FOA by feature fusion, thereby realizing the training of driving video attention model. The rear-end of the system carries out model reasoning by using an encapsulated algorithm model and videos acquired by the video acquisition and preprocessing module to obtain a prediction result of driving video attention area, rear-end model reasoning function can be called to respond by clicking the button component on the front-end of the system, and then the videos acquired by the video acquisition and preprocessing module are processed, and the obtained model result is stored.

Figure 9:
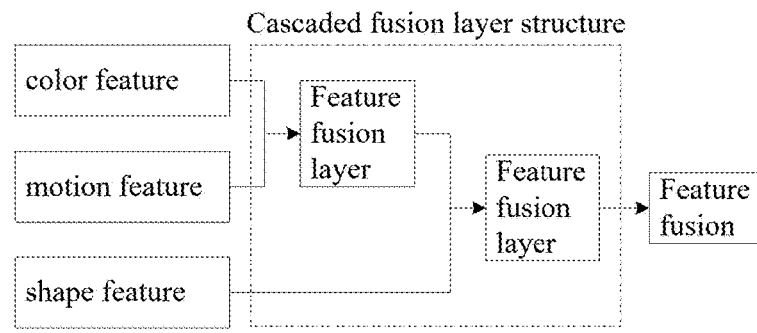
FIG. 9 illustrates a schematic block diagram of a fusion sub-module according to an embodiment of the disclosure.

Referring to FIG. 9, steps of constructing the deep learning model are as follows:

S2.1, color feature extraction, including: processing RGB color information of an original input driving video sequence based on a serial encoding module of C3D (three-dimensional convolutional neural network) and CBAM (convolutional block attention mechanism, also called as CBMA), and extracting a color feature through bilinear sampling;

S2.2, shape feature extraction, including: performing semantic segmentation on shape by dilated convolution, processing temporal information based on an encoding module of C3D, and extracting a shape feature by bilinear sampling;

S2.3, motion feature extraction, including: using a dense optical flow to obtain an optical flow field and thereby obtain motion information, processing temporal information based on an encoding module of C3D, and extracting a motion feature by bilinear sampling;

S2.4, feature fusion, including: fusing the color feature, the shape feature and the motion feature by a multi-layer depth feature fusion algorithm and thereby obtaining the resultant FOA.

The step of color feature extraction may be as follows:

using a serial feature fusion method to classify and identify features and thereby obtain a prediction effect of color feature, namely, realizing the processing of RGB color information of original driving video based on a serial encoding module of three-dimensional convolutional neural network (C3D) and CBAM and the extracting of color feature through bilinear sampling.

Figure 10:
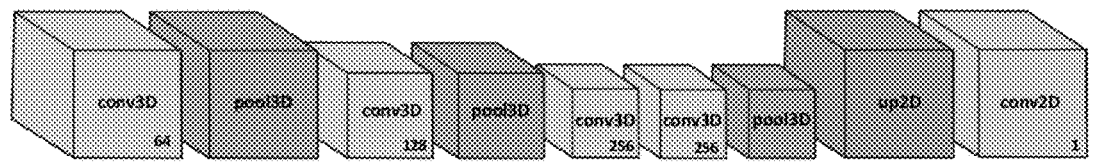
FIG. 10 illustrates a schematic network structure diagram of an encoding module of C3D according to an embodiment of the disclosure.

FIG. 10 illustrates a schematic network structure diagram of the C3D encoding module. The temporal information of the driving video sequence can be obtained through the C3D algorithm.

Figure 11:
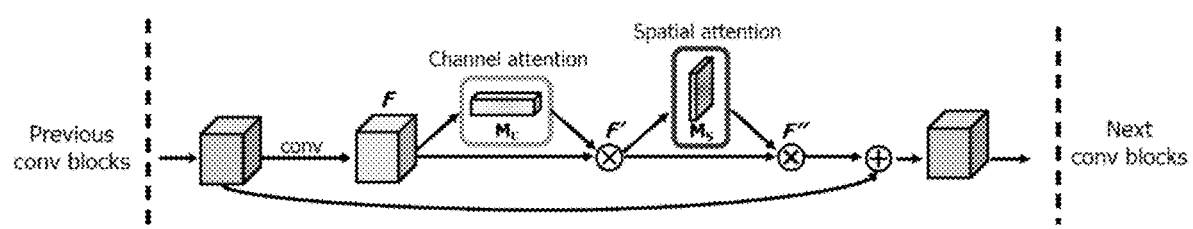
FIG. 11 illustrates a schematic network structure diagram of a CBAM according to an embodiment of the disclosure.

FIG. 11 illustrates a schematic network structure diagram of CBAM. In particular, CBAM is a lightweight general module that can be seamlessly integrated into any CNN architecture and trained end-to-end with a basic CNN, CBAM can make the model pay "attention" on more useful information. A CBAM process is divided into two independent parts, and the CBAM is divided into channel attention and spatial attention. In a channel attention model, firstly, a feature $F \in R^{H \times W \times C}$ is input, where H represents a height value, W represents a width value, and C represents a channel number of feature plane; and spatial dimensions are compressed by maximum pooling and average pooling respectively to obtain two channel descriptions of $1 \times 1 \times C$, and then they are sent into a two-layer neural network. The number of neurons in the first layer is C/R, an activation function is Relu, and the number of neurons in the second layer is C. The two-layer neural network is shared. Afterwards, a weight coefficient is obtained by that obtained two features are added together and then pass through a Sigmoid activation function. Finally, a new scaled feature F' can be obtained through multiplying the original feature F by the weight coefficient.

In a spatial attention model, a processing method is similar to that of the channel attention model. Given a new feature $F' \in R^{H \times W \times C}$, two channel descriptions of $H \times W \times 1$ are obtained through maximum pooling and average pooling respectively, and then added together. Afterwards, through a 7×7 convolution layer, an activation function is Sigmoid, and a weight coefficient is obtained consequently. Finally, a new scaled feature F″ can be obtained through multiplying the weight coefficient by the feature F′, namely, a spatial saliency feature is obtained. Due to the complementary attention of the spatial attention and the channel attention, CBAM can screen the feature spatial information in an all-round way. Finally, the FOA of color branch can be obtained through a bilinear up-sampling (to restore the representation to the resolution of input image) and a final two-dimensional convolution.

As to the shape feature extraction, a dilated convolutional network as used has a total of 8 layers, a convolution kernel size of each of first through seventh layers is 3×3, and a convolution kernel size of the last layer is 1×1. Because the dilated convolution will expand the image size, edge clippings are carried out on the first through seventh layers. Meanwhile, the expansion is from small to large, that is, obtaining local features from the perception of small areas and allocating features to more areas by large convolution. Moreover, the temporal information is extracted by a C3D-based encoding module, and finally the FOA of shape branch is obtained.

As to the motion feature extraction, based on a corresponding relationship between a previous frame and a current frame found by using changes of pixels in the temporal domain and a correlation between adjacent frames in an image sequence, motion information of an object between adjacent frames is calculated. The dense optical flow matches images point by point, calculates offsets of all points, and thereby obtains the optical flow field. Finally, the temporal information is extracted by a C3D-based encoding module, and the FOA of motion branch is obtained consequently.

As to the feature fusion, a multi-scale and multi-branch deep feature fusion algorithm is used, and the feature learning of convolutional neural network is used. Specifically, low-level features of color feature, shape feature and motion feature are learned firstly, the low-level features then are convoluted to a certain dimension through convolution operation to be fed back to high-level features, a feature fusion strategy is finally utilized to fuse a plurality of features and use structural information of different depth-level features to achieve complementary fusion among the low-level features, the high-level features and different features, thereby a prediction effect of model training is obtained, namely, a driver attention area prediction model is obtained.

The model application module is configured to perform area prediction on the processed driving video sequence through the trained deep learning model, thereby obtaining a driver attention area prediction result. The model application module is written in MATLAB language, is packaged into a callable function and is called through a MATLAB logic program, to complete the driving attention prediction of input video and obtain the prediction of the driver attention area to be predicted.

The result showing module is configured to show the result of a predicted video, store the predicted video in the same directory of the original driving video and directly jump to a playing interface of driving video of completion of prediction.

After the model training is completed, the trained model is used for model reasoning, the trained and packaged model is applied for processing the driving video sequence obtained by the video acquisition and preprocessing module, the result of predicted video is shown, the predicted video is stored/saved in the same directory as the original driving video, and it is directly jumped to the playing interface of driving video of completion of prediction.

Figure 12:
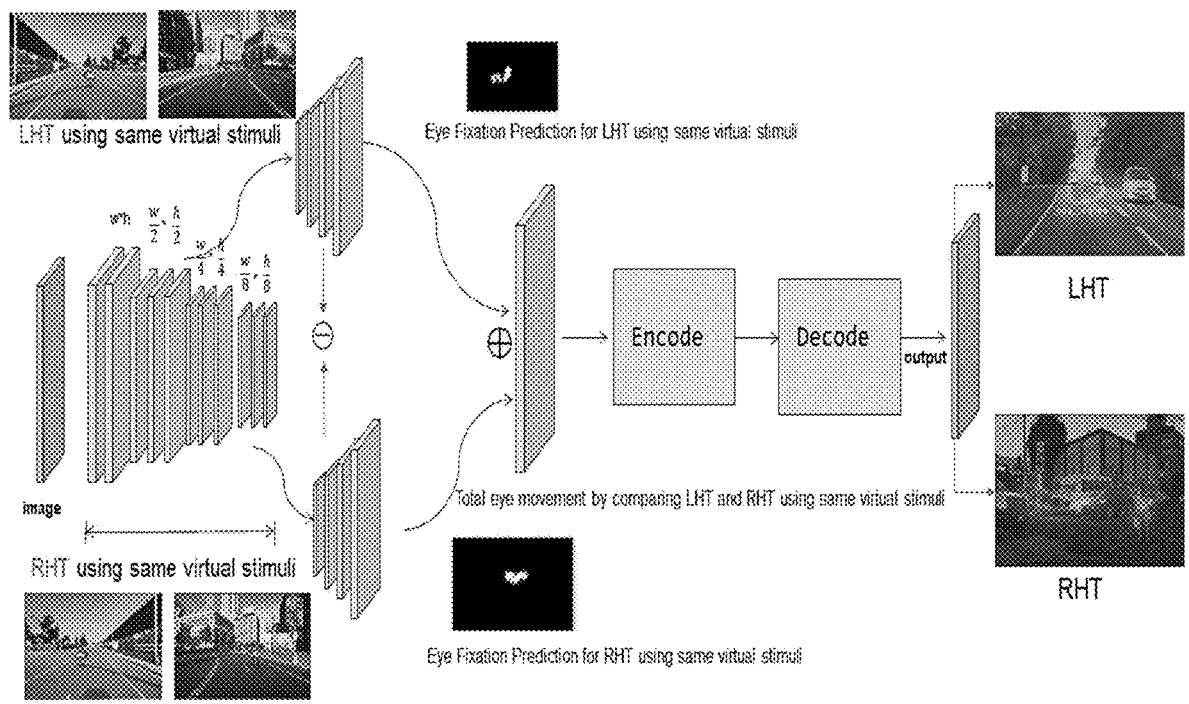
FIG. 12 illustrates an overall diagram of recommended eye movements by comparing the same virtual visual stimuli from LHT and RHT.

FIG. 12 illustrates an overall diagram of recommended eye movements by comparing the same virtual visual stimuli from LHT and RHT. The first step is using UNREAL Engine (UE4) to construct two identical driving scenes (see the four images on the left of FIG. 12) with the same visual stimuli for both LHT and RHT, and use the trained model to predict eye fixations (see the two images in the middle of FIG. 12) for both LHT and RHT. This fully considered the left gaze bias in humans when perceiving the visual stimuli, which is biologically inspired. After comparing the best choice between the predicted eye fixations and the collected eye fixations for the purpose of safety and comfort, the optimized eye fixation locations are used into the deep learning model. Finally, the predicted eye fixations and its corresponding attention areas are visualized on the HUD (head-up displays) of the vehicle.

The disclosure can predict driving attentions under safety and dangerous conditions aiming at two driving scenes of LHT (left-handed traffic) and RHT (right-handed traffic), can better know how to correctly allocate the driving attention, and has profound significance for a novice driver learning attention allocation and/or guiding automatic driving.

The above description is only preferred embodiments of the disclosure and is not intended to limit the disclosure, and various modifications and changes can be made to the illustrated embodiments of the disclosure by those skilled in the art. Any modification, equivalent substitution and improvement within the spirit and principle of the disclosure shall be included in the scope of protection of the disclosure.

What is claimed is:

1. A driver attention area prediction method, comprising:
   S1, acquiring an original driving video of a driver attention area and preprocessing the original driving video, thereby obtaining a processed driving video sequence;
   S2, constructing a deep learning model through a deep learning keras framework and training the deep learning model to obtain a trained deep learning model, comprising:
      S2.1, color feature extraction, comprising: processing red, green and blue (RGB) color information of an original input video sequence based on a serial encoding module of three-dimensional convolutional neural network (C3D) algorithm and convolutional block attention mechanism (CBAM) and extracting a color feature through bilinear sampling;
      S2.2, shape feature extraction, comprising: performing semantic segmentation on shape through dilated convolution, processing temporal information based on an encoding module of C3D, and extracting a shape feature through bilinear sampling;
      S2.3, motion feature extraction, comprising: using a dense optical flow algorithm to obtain an optical flow field and thereby extract motion information, processing temporal information based on an encoding module of C3D, and extracting a motion feature through bilinear sampling; and
      S2.4, feature fusion, comprising: fusing the color feature, the shape feature and the motion feature through a multi-layer depth feature fusion algorithm and thereby obtaining a resultant focus-of-attention (FOA);

S3, performing area prediction on the processed driving video sequence through the trained deep learning model, thereby obtaining a driver attention area prediction result;

S4, outputting the driver attention area prediction result, for a driver learning attention allocation or guiding automatic driving.

2. The driver attention area prediction method according to claim 1, wherein in the S1, preprocessing the original driving video comprises:

S1.1, selecting a mode of original driving video input;

S1.2, selecting an original driving video to be predicted according to the mode of original driving video input, thereby obtaining a selection result;

S1.3, performing preprocessing on the original driving video to be predicted based on the selection result and creating a dataset, thereby obtaining the processed driving video sequence.

3. The driver attention area prediction method according to claim 2, wherein in the S1.1, the mode of original driving video input is selected from four driving modes of right-handed traffic (RHT) safety condition driving, RHT dangerous condition driving, left-handed traffic (LHT) safety condition driving and LHT dangerous condition driving.

4. The driver attention area prediction method according to claim 2, wherein performing preprocessing on the original driving video to be predicted comprises:

performing preprocessing on the original driving video as acquired, abnormal video filtering, abnormal video repairing, missing video compensating, repeated video deleting, image grayscale processing, and image normalization processing.

5. The driver attention area prediction method according to claim 1, wherein outputting the driver attention area prediction result comprises:

showing a result of a predicted video, storing the predicted video in the same directory of the original driving video, and directly jumping to a playing interface of driving video of completion of prediction.

6. A driver attention area prediction system, comprising:

a video acquisition and preprocessing module, configured to acquire an original driving video of a driver attention area and preprocess the original driving video, thereby obtain a processed driving video sequence;

a model training module, configured to construct a deep learning model and train the deep learning model to obtain a trained deep learning model;

a model application module, configured to perform area prediction on the processed driving video sequence through the trained deep learning model, thereby obtain a driver attention area prediction result;

a result showing module, configured to show a driving video result of completion of prediction;

wherein the video acquisition and preprocessing module comprises a video acquisition sub-module and a video preprocessing sub-module, the video acquisition sub-module comprises a video mode selection unit and a video selection unit, the video mode selection unit is configured to select a mode of original driving video input and send a mode result to the video selection unit, the video selection unit is configured to select an original driving video to be predicted, the video preprocessing sub-module is configured to perform preprocessing on the original driving video as acquired, abnormal video filtering, abnormal video repairing, missing video compensating and repeated video deleting; and wherein the video acquisition and preprocessing module, the model training module, the model application module and the result showing module are software modules stored in a memory and executable by a processor coupled to the memory.

7. The driver attention area prediction system according to claim 6, wherein the model training module comprises a color feature extraction sub-module, a shape feature extraction sub-module, a motion feature extraction sub-module and a fusion sub-module; the color feature extraction sub-module is configured to process RGB color information of an original input video sequence based on a serial encoding module of C3D and CBAM, the shape feature extraction sub-module is configured to perform semantic segmentation on shape through dilated convolution, the motion feature extraction sub-module is configured to use a dense optical flow algorithm to obtain an optical flow field and thereby extract motion information, and the fusion sub-module is configured to fuse a color feature, a shape feature and a motion feature through a multi-layer fusion algorithm and thereby obtain a resultant FOA.

* * * * *